March 11, 1958  J. W. BROWN, JR., ET AL  2,826,672
METHOD OF WELDING FINS TO TUBES
Filed Feb. 16, 1955  3 Sheets-Sheet 1

INVENTORS.
JOHN W. BROWN, JR.
ARVID C. K. NIHLEN
BY
ATTORNEYS.

March 11, 1958 J. W. BROWN, JR., ET AL 2,826,672
METHOD OF WELDING FINS TO TUBES
Filed Feb. 16, 1955 3 Sheets-Sheet 2

INVENTORS.
JOHN W. BROWN, JR.
ARVID C. K. NIHLEN
BY Boswell, Sessions,
Hernstrom + Lawler
ATTORNEYS.

March 11, 1958     J. W. BROWN, JR., ET AL     2,826,672
METHOD OF WELDING FINS TO TUBES
Filed Feb. 16, 1955     3 Sheets-Sheet 3

INVENTORS.
JOHN W. BROWN, JR.
ARVID C. K. NIHLEN
BY
ATTORNEYS.

United States Patent Office 2,826,672
Patented Mar. 11, 1958

2,826,672

METHOD OF WELDING FINS TO TUBES

John W. Brown, Jr., Lakewood, and Arvid C. K. Nihlen, Oberlin, Ohio, assignors to Brown Fintube Company, Elyria, Ohio, a corporation of Ohio Application February 16, 1955, Serial No. 488,586

16 Claims. (Cl. 219—81)

This invention relates to a method and apparatus for resistance welding metal fin members to the exterior of metal tubes for producing finned tubes. The tubes are adapted particularly for use as heat exchange conduits, although they may also be used as structural members. Finned tubes of the general type to which the present invention relates are disclosed and claimed in the prior patents of John W. Brown, Jr., Nos. 2,261,136 and 2,226,137. An apparatus for making such finned tubes is disclosed and claimed in the prior patent of John W. Brown, Jr., No. 2,298,249, and a method for making such finned tubes is disclosed in the prior patent of John W. Brown, Jr., No. 2,298,250. All of these patents are owned by the assignee of the present application.

In the manufacture of heat exchangers it is frequently desirable to augment the area of the fluid conducting tubes employed in the heat exchangers by securing longitudinally extending fins to the exterior of the tubes. The prior Brown patents referred to above disclose finned tubes having desirable characteristics from the standpoint of heat transfer, and the method and apparatus patents disclose and claim methods and apparatus that have been widely used in the production of longitudinally finned heat exchanger tubes. According to the method of the prior Brown patents, the bases of two oppositely disposed finned members, which may have any desired cross-section such as a U shape or an L shape, are welded simultaneously to the tube by electric resistance welding to produce substantially identical rows of welded areas. The welding operation is carried out with opposite pairs of welds made by the use of two roller electrodes pressed against the bases of the two oppositely disposed finned members. The current flows through the tube from the weld in one fin base to the weld in the other fin base, and the pressure necessary to effect the weld is exerted by the welding electrodes.

This method has been highly successful but is somewhat limited in its application because the pressure exerted by the welding electrodes is resisted solely by the strength of the tube. This fact has made it impossible to weld successfully light gauge tubing and has required, even with 12 gauge tubing having a thickness of more than one-tenth of an inch and an outside diameter of two inches, that the welding operation be carried out at a relatively high speed and that the welds be made intermittently so as to preserve the strength of the tube as much as possible during the welding operation.

It is, accordingly, a general object of the present invention to provide an improved method and apparatus for welding fins to tubes which will not be subject to the difficulties and limitations of prior methods and by means of which fins can be welded to the exterior of tubes of such large diameter and light gauge that the tubes themselves have insufficient strength to resist the pressures required in the usual resistance welding operation. Another object is to provide such a method for making finned tubes which can be carried out rapidly and efficiently.

Another object is to provide such a method in which adequate paths for the transfer of heat between the bases of the finned members and the wall of the tube are provided. Further objects and advantages of the invention will become apparent from the following description of preferred forms thereof, reference being made to the accompanying drawings.

Briefly, our invention contemplates a method and apparatus for the production of finned tubes, of the type embodying longitudinally extending fins having bases which are welded to the exterior of the tubes, in which the diametrically opposite fin members are welded to the tubes simultaneously and the tubes are internally supported during the welding so that they can resist the pressure exerted by the electrodes, by means of a metallic member which has the property of substantially conforming to the interior wall of the tube regardless of reasonable variations in tube diameter and out-of-roundness of the tube, and of changing its external diameter when it is changed in length. In its simplest form, the member consists of a coil spring and in the preferred form of the invention the tube on which the fins are to be welded is slipped over an elongated coil spring while the spring is stretched to reduce its diameter. The spring is then released so that its convolutions firmly engage and support the interior of the tube; the fins are then welded onto the tube, preferably in an apparatus such as shown in the prior Brown Patent No. 2,298,249.

Referring now to the drawings.

Figure 5:
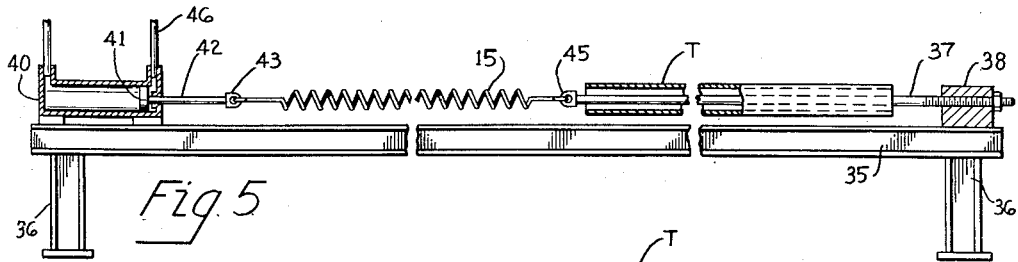

Figure 5 somewhat diagrammatically illustrates a preferred form of apparatus for placing the coil spring within the tubes.

Figure 6:
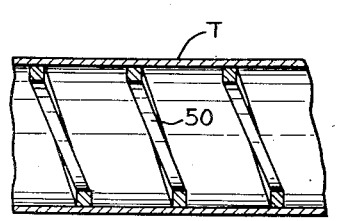

Figure 6 is a fragmentary longitudinal section showing a modified form of spring for supporting the tube.

Figure 7:
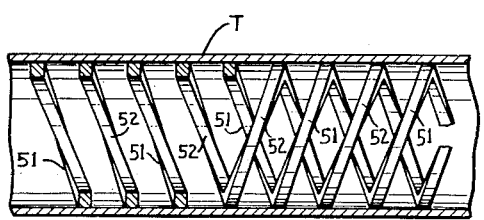

Figure 7 is a similar fragmentary section showing a still further modified form of spring for supporting the tube.

Figure 8:
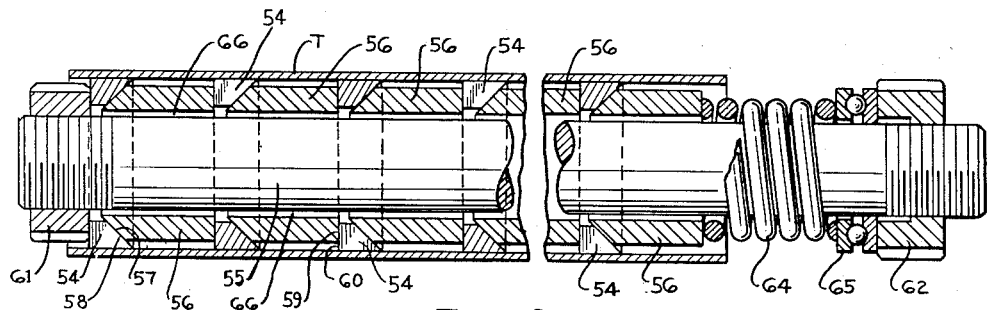

Figure 8 is a sectional view of a supporting member embodying a plurality of split rings which are cammed outwardly against the inner surfaces of the tube.

Figure 9:
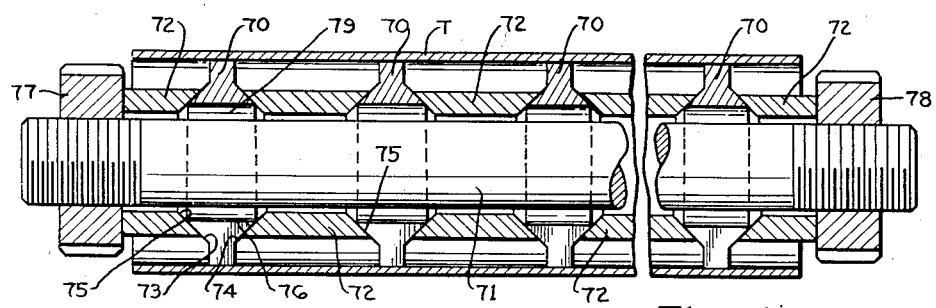

Figure 9 is a transverse sectional view showing another type of supporting member in which resilient split rings normally expand outwardly into engagement with the tube and are cammed inwardly to be released from the tube.

Figure 10:
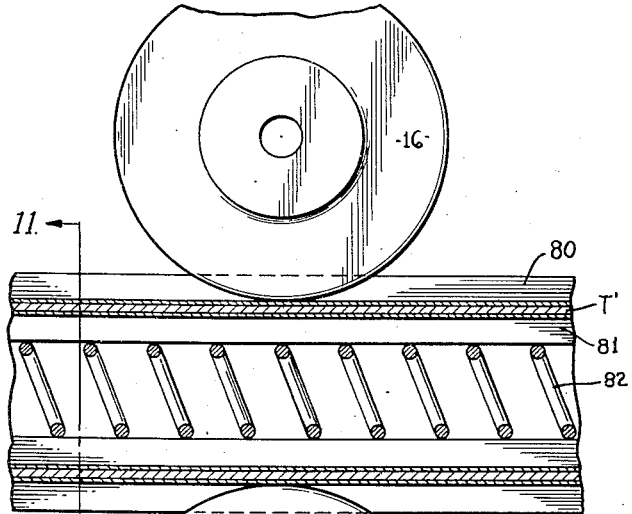
Figure 11:
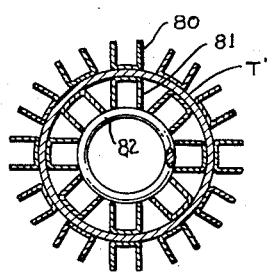

Figure 10 is a longitudinal sectional view somewhat diagrammatically illustrating the welding of fins onto the exterior of a tube which has previously been provided with internal fins as described in our co-pending application Serial No. 488,560, filed of even date herewith, and Figure 11 is a transverse section taken along line 11—11 of Figure 10.

Figure 1:
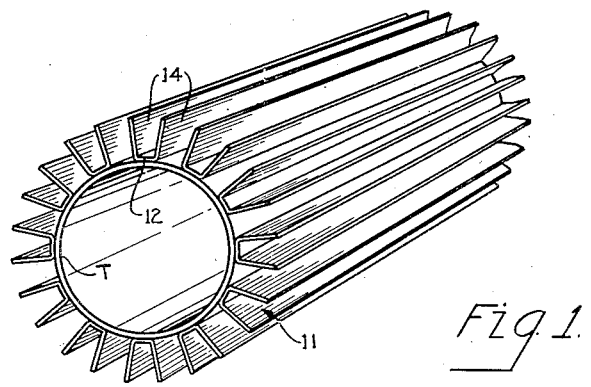
Figure 1 is a perspective view of a section of finned tubing made according to the invention.

As shown in Figure 1 of the drawings, a finned tube made according to a preferred form of the invention may comprise a tube T to which a number of finned members 11 are secured. In this form of the invention the finned members are shown as being of channel or U section, and each finned member comprises a base portion 12 that is welded to the exterior of the tube and two finned portions 14 formed integrally with the base. The base and the fins preferably are of substantially the same thickness and after the welding operation, the base portions conform closely to the exterior of the tube throughout a substantial part of their width. As indicated in the drawing, the tube T may be of quite thin wall thickness. So far as appears at present, the wall thickness is limited only by the thickness that would be required to make a proper weld in a conventional spot welding operation involving electrodes engaging directly on opposite sides of the weld. In any event there is no difficulty in welding fins having a thickness of .031" to tubing 1¾" in diameter and having a thickness of .031". The strength of such tubing by itself is entirely inadequate to withstand the pressures normally required for resistance welding operations without substantial deformation and such deformation prevents the welding operation from being carried out properly.

Figure 2:
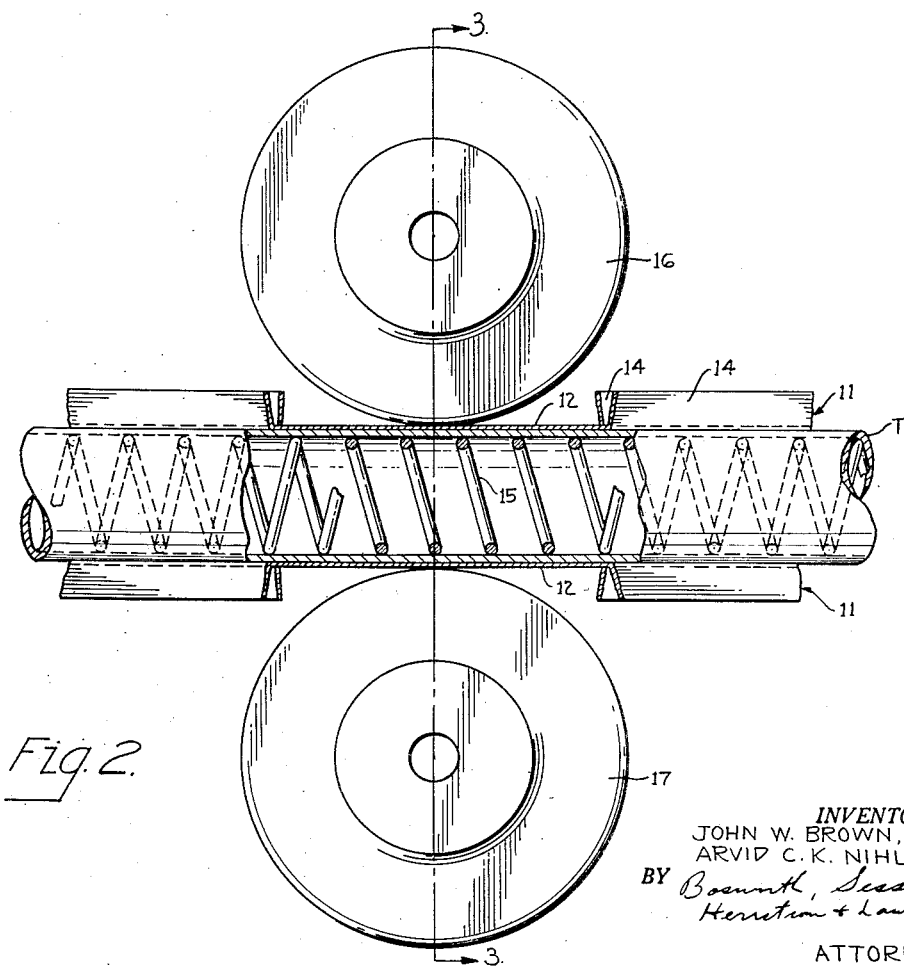
Figure 2 is a fragmentary elevation with parts in cross-section to illustrate somewhat diagrammatically the manner in which the welding operation is carried out.
Figures 3, 4:
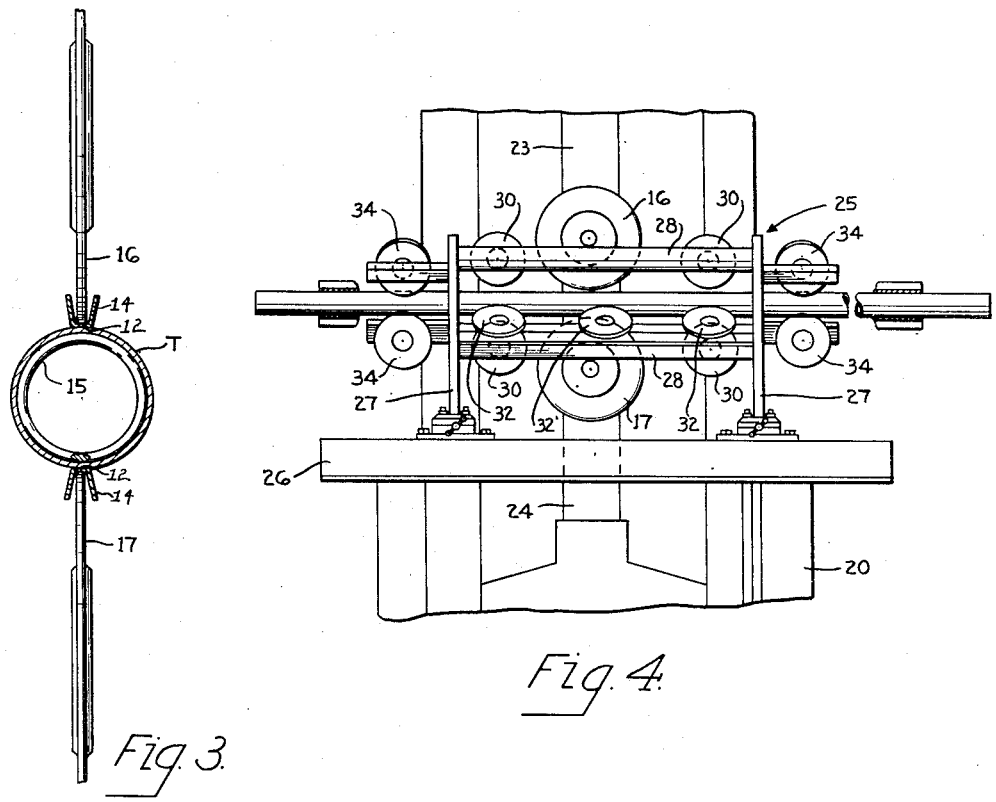
Figure 3 is a transverse sectional view taken as indicated on line 3—3 of Figure 2.
Figure 4 is an elevation showing a portion of a welding machine adapted to carry out the method and provided with apparatus for supporting and guiding the tube and fins through the machine.

In order to eliminate the difficulties that result from the weakness and ready deformability of light walled tube, we preferably carry out the welding operation as shown diagrammatically in Figures 2 and 3 wherein the tube is supported internally by a coil spring 15. The normal external diameter of the coil spring is slightly greater than the internal diameter of the tube T. The spring is inserted in the tube by first stretching the spring until its external diameter is less than the internal diameter of the tube and then slipping the tube over the spring while it is in the stretched condition. Thereafter the spring is released, whereupon it expands outwardly against the internal surface of the tube exerting a pressure thereupon. If desired, the tube may be vibrated as the tension on the spring is being released to assist the convolutions of the spring to seat themselves against the internal wall of the tube. The spring is selected to have, in conjunction with the tube, sufficient strength to withstand the welding pressures without undue distortion. The pitch and the diameter of the spring both contribute to the support of the tube. A spring with a smaller pitch, i. e., more turns per unit of length, can have smaller diameter wire for the same strength as a spring with fewer turns per unit of length and larger diameter wire. However, the convolutions of the spring should be spaced closely enough to prevent substantial deflection of the tube wall in the zones between adjacent convolutions. In the example given the spring was composed of wire about 3/32" in diameter, and the pitch of the spring was approximately one inch when the spring was in place within the tube. This gave completely adequate support against a welding pressure of several hundred pounds. However, for lighter gauge tubing, closer spacing of the convolutions may be required and larger diameter tubing of the same wall thickness probably would require a spring composed of heavier wire.

It is to be noted that each convolution of the spring presses outwardly more or less independently of the other convolutions so long as variations in diameter or shape between adjacent convolutions are not excessive. Tubing of the sort ordinarily employed in the manufacture of heat exchangers, such as seamless tubing, frequently varies slightly in diameter and is often of slightly oval rather than circular cross-section. Furthermore, the major or long diameter of the oval cross-section does not ordinarily stay in the same plane but rotates longitudinally of the tubing. The resilient support, however, is adapted to conform itself to the variations in the tubing of the order that occur in ordinary tubing manufacturing operations. Furthermore, the resilient spring support functions to support the tube wall against external pressure adequately even though the tubing may not be straight but may be curved somewhat. Thus, the resilient spring member substantially conforms to and is able adequately to support the tubing against the welding pressure regardless of variations in diameter, out-of-roundness, or lack of straightness of the tubing within the usual tubing manufacturing tolerances.

In operation the welding electrodes 16 and 17, Figures 2 and 3, engage the bases 12 of upper and lower finned members 11, and the welding current flows through the bases of the finned members and into the tube adjacent the welded area, the welds being made as the assembly of tube, spring and finned members is being progressed between the rotating welding electrodes. Between the welded areas the current flows through the wall of the tube and the spring, unless the spring is composed of insulated wire or is otherwise insulated from the tube.

For some operations it may be desirable to insulate the wire and thereby to prevent any likelihood of burning the interior of the tube where the wire of the spring engages it. In other instances it may be sufficient to make the spring of a rather poor conductor; for example, a stainless steel spring may be used where fins are being welded to tubes of ordinary low carbon steel, the tube having sufficient conductivity to carry the current between the bases of the fins. In other instances, as for example, when welding fins onto light gauge stainless steel tubing, it may be desirable to utilize a spring composed of a good conductor, such as beryllium copper, in which case a substantial portion of the welding current will flow through the spring.

The welding operation can be carried out advantageously in apparatus of the type shown in Figure 4 of the drawings and described in greater detail in the prior Brown Patent No. 2,298,249. The apparatus includes a conventional welding machine having a frame 20, only a portion of which is shown. Electrode rolls 16 and 17 form a part of the machine. These rolls are suitably driven and are supported from the frame by brackets 23 and 24, which are provided with means, such as air operated plungers (not shown), for urging the electrodes towards each other and thereby supplying the pressure required to carry out the welding operation. It is this pressure that must be resisted by the combined strength of the tube wall and the internal supporting member 15. Current is supplied to the electrodes by means of a conventional welding transformer, preferably with a thyratron or like control for timing and controlling the welding current.

In order to guide the tube and fins through the machine, the jig indicated generally at 25 is preferably employed. The jig is supported by frame member 26 of the welding machine and comprises a frame made up of end plates 27 and a plurality of longitudinal members 28, which are preferably welded to the end plates to form a rigid structure. A plurality of rollers are mounted upon suitable bearings carried by the longitudinal members 28, and these rollers are arranged to guide the tube and fins through the machine and to provide for convenient indexing of the tube for the welding of a plurality of pairs of fins thereto.

The rollers include two pairs of fin alignment rolls 30 that function to guide the fins and position them properly for the welding operation. Three pairs of centering rolls 32 and 32' are employed. The rolls 32 are conveniently disposed adjacent the alignment rolls 30, while the rolls 32' are preferably placed as close as possible to the welding zone. Indexing rolls 34 at the ends of the jig are angularly spaced from the alignment rolls 30 by an amount equal to the angle between adjacent pairs of fin members.

The operation and construction of the jig is described in greater detail in the aforesaid Patent No. 2,298,249. For purposes of the present application, it will be sufficient to say that the alignment rolls and indexing rolls engage within finned members, while the tube centering rolls engage the outer surface of the tube directly. The electrodes, of course, engage within the fins as shown in Figure 3. The several rolls function to guide the tube and fins through the apparatus as the assembly is being progressed by the driven electrode rolls.

The control for the welding current may be adjusted in any desired manner to produce the character of weld required. Preferably, the weld consists of a series of overlapping spots with scalloped edges to provide an excellent path for heat to flow between the tube or wall and finned base as described in prior Patent No. 2,261,137. The speed and pressure of the operation may be adjusted in any conventional manner to produce a good weld; the tube with its internal support has sufficient strength to resist the welding pressure so long as the pressure is maintained within the range ordinarily utilized in welding like materials of like thicknesses. Thus, with the tube supported by the inner resilient member, no particular care need be exercised in the welding procedure other than the ordinary care required to obtain good welds. The operation can be carried out rapidly, pairs of fins being welded on the tube simultaneously until the desired number of fins have been welded to the tube. After the welding operation has been completed, the spring is stretched to reduce its external diameter and release its frictional engagement with the interior of the tube, and thereafter it is removed from the tube.

Figure 5 illustrates a suitable apparatus for inserting the spring within the tube and for removing the spring therefrom after the welding operation has been completed. This apparatus comprises a frame 35 supported on legs 36 and having a rod 37 anchored at one end as at 38. At the other end of the frame 35, there is a fluid pressure cylinder 40 having a piston 41 and piston rod 42. Piston rod 42 is provided with an eye 43 at its end, and rod 37 is provided with a similar eye 45 at its end nearest the eye 43. The coil spring 15 is hooked to the two eyes, and fluid pressure is supplied to the cylinder 40 through the conduit 46, the tube T having previously been slipped over the rod 37.

The action of the cylinder 40 stretches the spring 15 and reduces its diameter. Then, with the spring elongated and contracted, the tube T is slipped over the spring 15. The pressure in the hydraulic cylinder is then released, permitting the spring to contract longitudinally and expand diametrically into firm engagement with the interior of the tube. If desired, the tube may be vibrated as the pressure in the cylinder is gradually released, so that the convolutions of the spring can better seat themselves against the inner surface of the tube. After the spring has contracted to its maximum extent, it is disconnected from the eyes 43 and 45 and the assembly is passed through the welding apparatus.

After the welding operation has been completed, the assembly is returned to the apparatus shown in Figure 5, the spring is hooked to the eyes 43 and 45, and the cylinder actuated to stretch the spring so that it will be released from engagement with the inner surface of the tube. Then the tube is slipped back over the rod 37, the spring is disconnected, the tube is removed, and the apparatus is ready for another operation.

Modified forms of the invention are shown in Figures 6 to 10, inclusive.

In Figure 6 the tube T is supported by a spring 50 which is similar to spring 15 except that it is made of square cross-section wire. Spring 50 is used in the same manner as spring 15.

Figure 7 shows a further modification in which the resilient supporting member is made up of two intermeshed springs, the convolutions of one spring being shown at 51 and the convolutions of the other spring being shown at 52. This type of spring is useful where considerable support is required and it is desired to have the convolutions spaced rather closely together without, however, requiring an undue stretching and lengthening of the spring to obtain the needed reduction in diameter thereof for insertion within the tube, as would be necessary if a single spring with closely spaced convolutions were used.

Figure 8 illustrates a different type of resilient internal support for the tube. Here the tube T is supported by a series of resilient split rings 54 which normally spring inwardly out of engagement with the interior of the tube; i. e., their normal external diameter is less than the internal diameter of the tube. The split rings 54 are supported on a central arbor or mandrel 55, which may take the form of a rod or a tube and which carries on it a series of solid camming rings 56. Rings 56 are beveled at one end as at 57 to correspond to the bevel 58 of the split rings and have radial surfaces 59 to abut the radial surfaces 60 of the split rings. Nuts 61 and 62 are disposed at opposite ends of the arbor 55. Nut 61 functions as a stop against which the assembly may be drawn up by tightening nut 62 to reduce the length of the assembly of split rings and camming rings to urge the camming rings toward each other and cam the split rings 54 outwardly against the inside of the tube. Preferably, the nut 62 acts on the adjacent camming ring 56 through compression spring 64 and thrust bearing 65.

With this arrangement, when the nut 62 is loosened so that the camming rings do not exert any substantial pressure on the split rings, the split rings take their normal contracted diameter and the tube can be readily slipped over the assembly. After the tube is positioned over the assembly the nut 62 is tightened up. The force exerted by the nut through the spring 64 causes the camming rings to cam the split rings outwardly into firm supporting engagement with the interior surface of the tube, thus enabling the inner assembly to support the tube against external pressures such as the pressures exerted by the welding rolls.

It will be noted that the split rings 54 can expand varying amounts to compensate for variations in diameter of the tube and that the radial surfaces 59 and 60 of the camming rings and split rings, respectively, permit adjacent split rings to move independently of each other along with their associated camming rings, there being a clearance as at 66 between the arbor 55 and the camming rings 56 to permit this action to take place. Thus, the rings can accommodate themselves individually to reasonable variations and irregularities in the tube diameter.

The spring 64 constantly urges the camming rings in a direction to force the split ring outwardly. The presence of the spring gives a resilient action to the assembly, so that if, for example, the tube should expand under the influence of heat, the spring will continue to force the camming rings outwardly and cause them to expand and maintain their firm contact with the interior of the tube.

Another modification of the invention is shown in Figure 9. Here the tube T is internally supported by a series of split rings 70 which are normally of a greater diameter than the internal diameter of the tube and thus normally resiliently support the tube. These rings are mounted on an arbor 71 along with intermediate camming rings 72. Split rings 70 have camming surfaces 73 and 74 on opposite sides thereof which are engaged by camming surfaces 75 and 76, respectively, on opposite ends of the camming rings 72. In this case there are nuts 77 and 78 at either end of the arbor 71, and either of these can be used to change the length of the assembly. Shortening of the assembly of split rings and camming rings in this case causes the split rings to be constricted inwardly, thereby reducing their external diameter so that the assembly can be inserted within a tube.

After the assembly has been inserted within the tube, the pressure exerted by the nuts 77 and 78 is released, and the split rings 70 are permitted to expand outwardly into engagement with the internal surface of the tube to support it against external pressures. The rings, as before, can conform themselves individually to the internal surface of the tube, there being ample clearance as indicated at 79 between the rings and the outer surface of the arbor 71.

After the nuts 77 and/or 78 have been released so that the tube is properly supported, the welding operation is carried on as before, with the rings 70 supporting the tubing against the welding pressures. After the welding operation is completed, the nuts 77 and 78 or either of them are tightened toward each other, thereby camming the split rings 70 inwardly and releasing them from engagement with the interior of the tube, so that the assembly can be removed from the tube and used again in another welding operation.

Figures 10 and 11 illustrate a method of making the tube having fins on both the inside and the outside. Here the tube T' is provided with external fins 80 and internal fins 81. The fins, in each case, are preferably formed of channel section fin members, and the internal fins are preferably secured in place in the manner described in our co-pending application Serial No. 488,560, filed of even date herewith. According to that application, fins are brazed to the inner surfaces of a tube by holding them in place by a resilient member, such as the coil spring 82, which is first contracted diametrically so that the spring, with a series of fins in position around it, can be inserted within a tube and is then permitted to expand diametrically to hold the finned members firmly in place against the interior of the tube. A brazing metal is supplied to the surfaces to be joined together and the assembly heated to fuse the brazing metal and bond the fins to the inner surface of the tube.

According to the invention of our aforesaid co-pending application, this completes the tube with the internal fins, and ordinarily the spring supporting member is then removed from the assembly. According to the present invention, however, the spring supporting member is left in place, and the fins 80 are resistance welded to the exterior of the tube by passing the assembly between the welding electrodes 16 and 17 in the manner heretofore described, this operation being illustrated diagrammatically in Figure 10. After the welding operation is completed, the supporting spring 82 may be removed, leaving the tube with internal and external fins firmly bonded thereto.

This operation is useful where it is desired to provide ferrous tubes with inside and outside fins. The fins are secured to the inner surface preferably by copper brazing in a protective atmosphere, while the fins are secured to the outer surface by the resistance welding method just described.

From the foregoing description of preferred forms of the invention, it will be evident that the invention provides a method and apparatus whereby fins can be welded to the exterior of light gauge tubes efficiently and expeditiously. The internal support of the tubes is such that proper support is obtained regardless of variations in tube diameter and out-of-roundness with normal commercial standards. The supporting members, particularly when they take the form of coil springs, are inexpensive, and it is a simple matter to assemble the tubes and the supporting members and to remove the supporting members from the tubes after the welding operation has taken place. The efficient support of the tubes makes it possible to select proper welding procedures to obtain the best type of welds for the particular service without requiring the modification of the welding procedures because of the nature of the tube, the tube at all times being adequately supported against welding pressure that may be required.

Various changes and modifications in the invention will be apparent to those skilled in the art. The essential characteristics of the invention are defined by the appended claims.

We claim:

1. The method of making finned tubes which includes the steps of providing a supporting member having a plurality of spaced convolutions which have the characteristics of diametrically contracting substantially uniformly in all directions when the length of the member is changed in one sense and diametrically expanding substantially uniformly in all directions when the length of the member is changed in the opposite sense, positioning said member within a tube when it is diametrically contracted, changing the length of the member to cause said convolutions to expand diametrically and support the inner surface of said tube, providing separate fin members each having a base portion and a fin portion, assembling a pair of such members with said tube with the base portion of each member engaging the exterior of the tube and extending generally longitudinally thereof and with the members disposed substantially diametrically opposite each other, resistance welding said base portions to said tube by engaging each of said base portions with an electrode, exerting welding pressure upon said base portions toward the axis of the tube by said electrodes, causing a welding current to flow between said electrodes through said base portions and through the wall of the tube and around the circumference thereof, progressing said assembly with respect to said electrodes and continuing the flow of current to weld said base portions to said tube, and thereafter indexing said tube and similarly resistance welding the base portions of another pair of fin members to the tube.

2. Apparatus for welding fins to the exterior of a tube comprising a plurality of spaced convolutions of resilient material which are adapted to change their diameter from a diameter such that they can readily be inserted in the tube to a diameter such that they support the tube against deformation by external pressures, means for reducing and subsequently increasing the diameter of said convolutions so that they can be readily disposed within said tube and then caused to support the tube against external pressure, means for guiding a pair of fin members longitudinally along the exterior of the tube, and a pair of oppositely disposed electrodes adapted to engage said fin members, exert welding pressure against said fin members and radially inwardly on said tube and weld said fin members to said tube.

3. The method of making a tube having internal and external longitudinally extending fin members which includes the steps of supporting a plurality of fin members having base portions and inwardly extending fin portions within the tube by means of a member comprising a plurality of resilient convolutions adapted to engage the inner edges of said fin portions and resiliently urge the base portions of the fin members outwardly into contact with the interior of the tube, resistance welding a plurality of fin members to the exterior of the tube by means of electrodes engaging said exterior fin members and applying welding pressure thereto in a radially inward direction, and supporting said tube against deformation by said member acting through said internal fin members during the welding operation.

4. The method according to claim 3 wherein the convolutions of said member are contracted and the member removed from the tube after the welding operation has been completed.

5. In the manufacture of finned tubes by resistance welding fin members to the exterior surface thereof by a method which includes the steps of positioning a plurality of fin members, each having a base portion and a fin portion, on the exterior of the tube and extending generally longitudinally thereof, engaging each of said base portions with an electrode, exerting welding pressure upon said base portions toward the axis of said tube by said electrodes, causing a welding current to flow between said electrodes through said base portions and through the wall of the tube, progressing said assembly with respect to said electrodes and continuing the flow of current to weld said base portions to said tube, the improvement which comprises the additional steps of providing a supporting member comprising a plurality of resilient metallic convolutions, said convolutions being contractible and resiliently expansible in varying amounts, positioning said member within a tube when said convolutions are contracted, thereafter causing said convolutions to expand and support the inner surface of the tube throughout substantially the entire circumference thereof, and carrying out the welding operation while the tube is so supported.

6. In the manufacture of finned tubes by resistance welding fin members to the exterior surface thereof by a method which includes the steps of positioning a pair of fin members, each having a base portion and a fin portion on the exterior of the tube and extending generally longitudinally thereof and with the members disposed substantially diametrically opposite each other, engaging each of said base portions with an electrode, exerting welding pressure upon said base portions toward the axis of said tube by said electrodes, causing a welding current to flow between said electrodes through said base portions and through the wall of the tube, progressing said assembly with respect to said electrodes and continuing the flow of current to weld said base portions to said tube, the improvement which comprises the additional steps of providing a supporting member comprising a plurality of spaced resilient metallic convolutions, said convolutions being contractible and resiliently expansible in varying amounts upon change of length of said member, positioning said member within a tube when said convolutions are contracted, thereafter changing the length of said member and causing said convolutions to expand and support the inner surface of the tube throughout substantially the entire circumference thereof and carrying out the welding operation while the tube is so supported.

7. The method of making externally finned tubes which includes the steps of providing a coil spring having, at one length thereof, a diameter such that the convolutions thereof are adapted to exert an outward force on the interior of a tube to which it is desired to weld external fin members, elongating said spring to reduce its diameter to a diameter such that it may be readily inserted within the tube, inserting said spring into the tube while it is elongated, shortening said spring whereby the convolutions thereof exert an outward force on the tube and support the tube against external forces, and while the tube is so supported, progressively resistance welding separately formed longitudinally extending fin members to the exterior of the tube by means of electrodes which exert radially inward welding pressure on the fin members and tube.

8. The method of making externally finned tubes which includes the steps of providing a coil spring having a normal diameter such that the convolutions thereof are adapted to exert an outward force on the interior of a tube to which it is desired to weld external fin members, applying a force to said spring to reduce its diameter to a diameter such that it may be readily inserted within the tube, inserting said spring into the tube while its diameter is reduced, releasing said force on said spring to permit it to expand toward its normal diameter whereby the convolutons thereof exert an outward force on the tube and support the tube against external forces, and while the tube is so supported, progressively resistance welding longitudinally extending fin members to the exterior of the tube by means of electrodes which exert radially inward welding pressure on the fin members and tube.

9. The method of making an externally finned tube which includes the steps of supporting the tube against external pressure by means of a plurality of spaced metal convolutions and resistance welding fin members to the exterior of the tube by means of electrodes exerting welding pressure on the exterior of the tube in a radially inward direction while it is so supported.

10. The method of making an externally finned tube which includes the steps of supporting the tube against external pressure by means of a coil spring extending longitudinally of the tube and resistance welding fin members to the exterior of the tube by means of electrodes exerting welding pressure on the exterior of the tube in a radially inward direction while it is so supported.

11. In combination, a plurality of resistance-welding electrodes adapted to exert welding pressure radially inwardly on the exterior of a tube, and means for supporting the tube against such externally applied welding pressures comprising a member having a plurality of longitudinally spaced convolutions of resilient metal, which convolutions are adapted to change their diameter from a reduced diameter such that the member can readily be inserted within the tube to an enlarged diameter such that the member can support the tube against externally applied forces of the tube consequent upon a change in length of the member, and means for changing the length of the member.

12. Apparatus according to claim 11 wherein the member comprises a coil spring.

13. Apparatus according to claim 12 wherein the spring is composed of wire of rectangular cross section.

14. Apparatus according to claim 11 wherein the member comprises two intermeshed coil springs.

15. Apparatus according to claim 11 wherein the member comprises a series of split resilient rings of normally reduced diameter and a plurality of camming rings adapted to expand the rings consequent upon shortening the member.

16. Apparatus according to claim 11 wherein the member comprises a series of split resilient rings of normally enlarged diameter and a plurality of camming rings adapted to contract the rings consequent upon shortening the member.

References Cited in the file of this patent

UNITED STATES PATENTS

| Number | Name | Date |
|---|---|---|
| 166,294 | Orum | Aug. 3, 1875 |
| 1,351,445 | Smith | Aug. 31, 1920 |
| 1,602,165 | Parker | Oct. 5, 1926 |
| 1,696,455 | Rupley | Dec. 25, 1928 |
| 2,004,787 | Gillette | June 11, 1935 |
| 2,014,240 | Tarbox et al. | Sept. 10, 1935 |
| 2,298,249 | Brown | Oct. 6, 1942 |
| 2,321,308 | Miller | June 8, 1943 |
| 2,550,965 | Brown | May 1, 1951 |